2,538,269

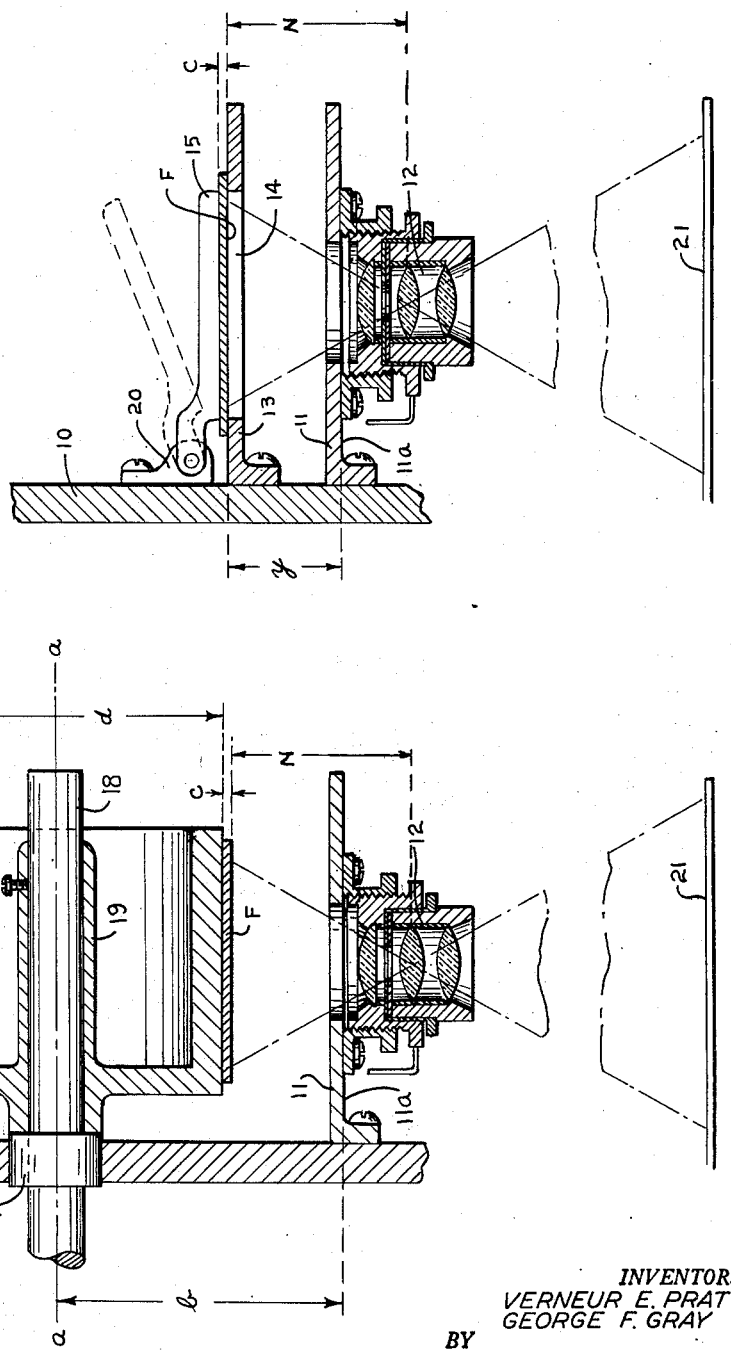

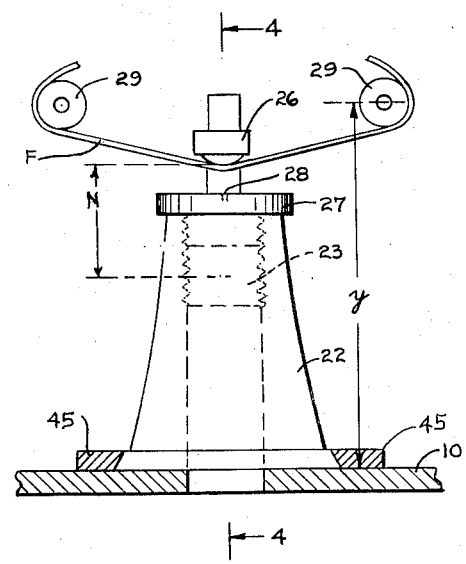
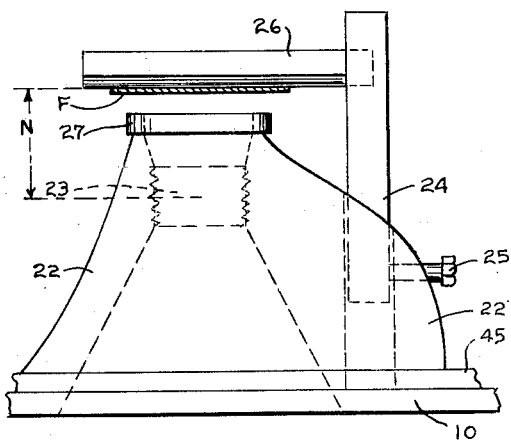
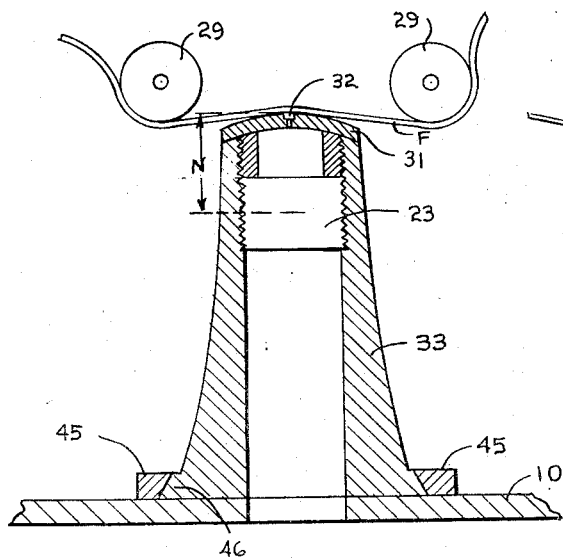
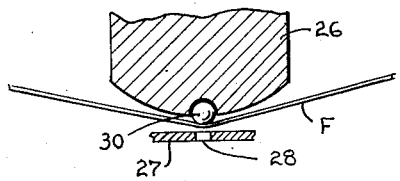
INVENTORS
VERNEUR E. PRATT
GEORGE F. GRAY
BY
Van Deventer & Grier
ATTORNEYS Jan. 16, 1951
V. E. PRATT ET AL
2,538,269
COMBINATION LENS MOUNTING AND FILM SUPPORT
FOR MICROFILM APPARATUS
Filed March 7, 1947
3 Sheets-Sheet 3
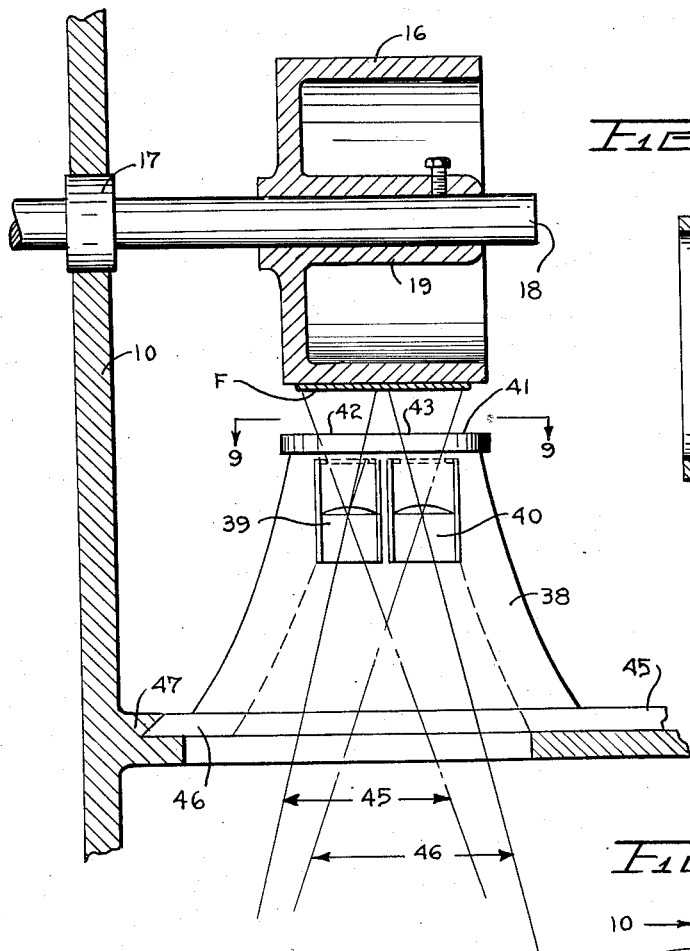
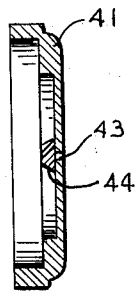
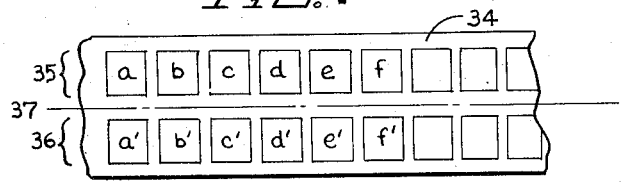
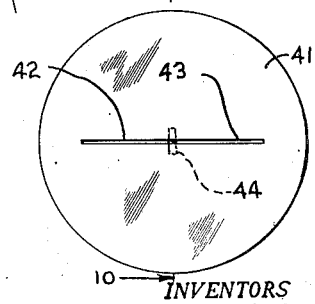
INVENTORS
VERNEUR E. PRATT
GEORGE F. GRAY
BY
Van Deventer & Grier
ATTORNEYS Patented Jan. 16, 1951

UNITED STATES PATENT OFFICE 2,538,269

COMBINATION LENS MOUNTING AND FILM SUPPORT FOR MICROFILM APPARATUS

Verneur E. Pratt and George F. Gray, Norwalk, Conn.

Application March 7, 1947, Serial No. 732,971

6 Claims. (Cl. 88—24)

This invention relates to lens mounting and film support for microfilm apparatus and more particularly to such mountings for use in microfilm devices such as those disclosed in the co-pending applications:

Ser. No. 507,939, filed October 28, 1943 entitled Photographic Devices and Method of Operating Same, now Patent No. 2,435,099 of Jan. 27, 1948, and Ser. No. 547,131, filed July 29, 1944 entitled Photographic Devices, now Patent No. 2,478,980 of August 16, 1949.

An object of this invention is to provide a lens mounting combined with a film support.

Another object is to provide a lens mounting with a slit forming member forming part of the mount.

Another object is to provide a lens mounting wherein two lenses may be employed in side-by-side relation to produce a double row of images on a film.

A further object is to provide a combined lens mount and film support that will eliminate troubles now encountered due to temperature changes in the apparatus.

Other objects and advantages will be pointed out hereinafter particularly in connection with the following brief discussion of the prior art necessary to a proper understanding of the invention.

While the following specification and accompanying drawings disclose, by way of illustration, preferred embodiments of the invention, it will be understood that many changes can be made from what is herein shown without departing from the invention as defined in the appended claims.

In the accompanying drawings:

Figures 1 and 2 are diagrammatic views of prior art lens mounts and their associated film supports or gates for the purpose of illustrating certain features of prior art construction in order to clearly understand the advantages and construction of the instant invention, and how it distinguishes from such prior art.

Figure 3 is a front view of a lens mount embodying the invention.

Figure 4 is a side view of the lens mount shown in Figure 3.

Figure 5 is a detail view of a roller than can be applied to the lens mount shown in Figures 3 and 4, 6 and 8.

Figure 6 is a front view of an alternate form of lens mount embodying the invention;

Figure 7 is a plan view of a film made by a camera employing the lens mount of Figure 8;

Figure 8 is a side view of a twin-lens mount embodying the invention; and

Figures 9 and 10 are details of the mount shown in Figure 8.

In Figure 1 is shown a lens mount and film support (often termed a "film gate") and illustrates diagrammatically a construction in common use. The framework of a camera is indicated at 10, and this supports a horizontal member 11 upon which the lens 12 is mounted.

The film support comprises a fixed platen 13 secured to the frame 10 having an opening (or a glass 14 therein) upon which the film F is supported and to which it is pressed by a pressure plate 15 which is hingedly or otherwise movably supported on frame 10.

It will be understood that the pressure on the film is removed when the film is moved, the member 15 usually being intermittently raised by suitable mechanism (not shown) to permit of such film movement.

In such arrangements, it is necessary to very accurately construct or assemble all parts shown to obtain and maintain the dimensions X and Y. These and other difficulties will be discussed in connection with Figure 2.

The device Figure 1 can be used in flow cameras where the photographing is done with the film in motion, provided the pressure plate 15 is urged toward the film with a light touch insufficient to scratch the film support or base.

The construction shown in Figure 1 is open to other serious objections and limitations which need not be discussed here but which are well understood and which brought into being the construction shown in Figure 2 which is in extended use in the microfilm field, and particularly in flow cameras.

Referring to Figure 2, a revolving drum 16 is mounted in bearing 17 supported in the frame 10. The film is supported on this drum and is moved across the back focus of lens 12 by the rotation of the drum or by any suitable means. Details of devices employing this type of construction are shown in the co-pending applications previously mentioned.

In practically all types of microfilm cameras such as referred to above and in the aforesaid copending application, the copy support for the copy 21 is secured to or forms part of the framework 10 of the camera, so as to support the copy 21 in the front focus of the lens 12.

A suitable source of illumination is provided for illuminating the copy so that in the manner common to all cameras of this description, the lens of the camera receives the light reflected from the copy on the copy support and an image on the film in the rear focus of the lens is produced in the usual manner.

While the construction shown in Figure 2 does not have some of the limitations and objections of that shown in Figure 1, it inherently has certain objectionable features in common therewith. Among these (and the objects of the instant invention are their elimination) are:

(A) Much of the trouble in making production cameras to make high-resolution microfilm is in holding tolerances on the drums 16. A run-out eccentricity of .0015 inch on factory production does not give satisfactory results, and in a certain commercial device, a limit of run-out of .0003 inch is obtained by difficult and expensive selection and manufacturing and assembling. This "run-out" affects the dimension "N" of Figure 2 which corresponds to the dimension "N" of Figure 1 and is the critical distance between the sensitive emulsion surface of film F and the nodal point of the lens 12, a very critical dimension in short-focus lenses and a dimension that is adjusted to a fraction of a mm.

In making these drums 16, therefore, it is necessary to have them concentric with axis "a"; to keep the diameter "d" the same on all drums and to have the shaft 18 supporting the drum perpendicular to the inner face of the support 10.

(B) To maintain the dimension N on commercial machines so as to make various lens mounts interchangeable, it is obvious that the axis "a" of the drum shaft must be properly spaced from the outer surface 11a of the lens support. This means careful machining and location of the member 11, the bearing 17 in frame 10, the bore in the bearing for the shaft 18, and the bore in the hub 19 of drum 16.

Care is also necessary with the construction of Figure 1 as to the machining and relative location of the supports 13 and 11 and the pressure plate bearing support 20.

(C) As yet, no way has been found—granted that the difficulties of manufacturing and assembling have been overcome—to compensate for the coefficient of expansion of aluminum or other metal frame members 10. Under operating conditions with a 50° F. differential, the dimension "b" may vary as much as .0005 inch, which seriously and adversely affects the resolution.

(D) With the construction shown in Figure 2, variations in the thickness of the emulsion on the film varies the dimension "C," thereby causing a variation in the important dimension "N."

From the foregoing, it can be readily seen that to obtain the accurate dimensions necessary in high resolution microfilm apparatus, it is necessary to work to close tolerances. Now, if in a given machine, all tolerances are plus, the device would not produce good microfilm. This has necessitated careful and expensive inspection and selection of parts and much hand fitting, and has made the interchanging of lenses between machines in factory assembly very difficult and expensive.

(E) As it is difficult to maintain accurate dimensions in these machines, it has been customary to equip them with lenses such as shown at 12 which can be focussed, so that the user can focus the lens and thereby adjust the "critical" dimension "N" if for any reason of manufacturing or assembly it is not correct.

Now, these short-focus lenses require focussing (between film and lens) to the thousandth of an inch—an adjustment that can only be made by an expert having proper equipment and experience. Such a focussing operation is usually entirely beyond the ability of the average operator of the machine. It is therefore highly desirable to employ fixed focus lenses that can be easily changed in any given machine (or between machines) and which are focussed at the factory and never require subsequent focussing as they are pre-focussed.

It is difficult—in fact commercially impractical—to do this with the lenses mounted as shown in Figures 1 and 2 or in any other known manner, as the space behind the upper face of the lens mount and the film in some cameras is less than 5 mm., and the image of the copy 21 made by the lens on the film "F" cannot be observed, and even if seen is so small and in slit form that no one, even with a microscope, can properly see to focus the lens; focussing, therefore, must be done on a trial-and-error basis by making sample film at various lens locations, processing said film, and by microscope examination selecting the best focus position and re-setting the lens finally to that chosen best focus position. Such an operation obviously cannot be performed by the user of the machine, so interchangeable fixed focus lenses are not only highly desirable but are a practical necessity.

Referring now to the instant invention, Figure 3 shows a lens mount embodying same. Here the framework 10 of the camera supports a turret or lens mounting frame 22 in which is mounted the lens system 23. The lenses may be adjustable in the mounting for convenience in assembly, but once assembled, are never again adjusted.

An arm 24 is vertically adjustable in the mounting 22 and is held therein by any suitable means such as the screw 25. This arm has a horizontally extending platen 26 secured thereto which overlies the cap 27 of the mounting, said cap having the slit 28 therein.

The film F rests against the bottom arcuate surface of platen 26 with its emulsion side toward the lens. By adjusting the arm 24, the critical dimension "N"—the distance between the film and lens—is adjusted and once this is accomplished, the adjustment is fixed. Such adjustment can be made with the lens mount out of the camera.

The film is fed across the platen 26 in any suitable manner such, for example, as that shown in the co-pending applications hereinbefore mentioned.

The rollers 19 may be guide rollers or feed rollers and may be mounted on the framework 10 of the camera and it will be noted that no particular accuracy in spacing them from the base of frame 10 (the dimension "Y" Figure 3) is necessary as all critical dimensions are taken care of in the lens mount assembly which not only supports the lens, but also supports, on the same assembly, the film in fixed relation to the lens.

The platen 26 may be made of or faced with carbaloy or agate or some other hard non-wearing material, or may have therein a roller 30, Figure 5, against which the film F is held taut by the film-feeding mechanism, so that the roller revolves in a suitable bearing in the platen 26. This roller may help to reduce friction on the film during its traverse across the platen 26 while it receives images in the back focus of lens 23.

The construction just described eliminates the difficulties discussed in connection with paragraphs A and B hereof.

The construction shown in Figures 3 to 5 inclusive eliminates precision work on the film drive and supporting parts of the camera and confines it to the lens mount per se. This being a relatively small device, it is not seriously affected by temperature changes as discussed under paragraph C hereof.

The construction shown in Figures 3 to 5 inclusive does not eliminate troubles due to variations in the thickness of film stock or the emulsion thereon, as discussed under paragraph D hereof.

To eliminate difficulties due to variations in the film thickness "C" the construction shown in Figure 6 may be employed. Here, the platen supporting the film F takes the form of an arcuate cap having the slit 32 therein transverse the film. Here the critical distance "N" is between the outer surface of the emulsion on film F and the nodal point of the lens 23 and, because of the relatively small dimensions of the one-piece turret 33, this dimension can be made very accurately at low cost.

The platen block 31 can be made of any suitable material, same as the platen 26, Figures 3 and 4, and the slit 32 may have rollers at each side thereof, similar to roller 30, Figure 5.

The film F overlies the platen 31 and is held against same by any suitable film-feeding mechanism. If desired, a weight or spring-pressed member can be supported either on the turret 33 or on the frame 10 to overlie the film F Figure 6 in order to press the film down against the slit in the arcuate cap 31. Such a member resembles member 26 of Figure 3 and can be of any suitable construction as its only purpose is to gently press the film against the cap 31 so that same always remains in contact therewith, covering the slit 32. Variations in the thickness of the film stock or emulsion cannot change the critical dimension "N," Figure 6.

As the lips of the slit 32 are in contact with the film, the opening against the film is clearly defined. A typical slit may be .080 inch wide x 1⅜ inches long, and the curvature of the top of platen cap 31 may be on a 2½ inch radius.

Because of the extreme accuracy that can be attained in a lens mount constructed in accordance with the instant invention, a double lens mount for making twin rows of 15 mm. images on one width of 35 mm. film can be easily and cheaply constructed to be interchangeable with the 35 mm. single-row-one-lens mount previously described, and for use in the same camera to produce duplicate micro-photographs side-by-side of the same copy.

Such twin-images are shown in Figure 7 wherein 34 denotes the film and each pair of duplicate images are shown at $a, a^1; b, b^1; c, c^1; d, d^1; e, e^1$. Such a film is made in a flow camera by feeding copy "$a$," for example, through the camera and making two simultaneous exposures via the twin-lens to produce images $a, a^1$, etc. To produce such twin images with a single lens camera would require feeding the copy to complete row 35, then re-winding the film and again feeding the copy to produce row 36. Or a twin-sided camera must be used, each camera complete with lens, and each loaded with a separate 16 mm. film. The result is two 16 mm. negatives exactly alike. With the 35 mm. film shown in Figure 7 it is only necessary to photograph once in a single camera then slit the film longitudinally along line 37 and remove 1½ mm. from each edge to produce the duplicate negatives.

Obviously, the 35 mm. negative film can be used to print positives, which are then split at 37 to produce duplicates.

The twin-lens mount will first be described as applied to existing cameras having drums 16 as described in connection with Figure 2. Such cameras are described in the aforesaid applications.

Referring to Figure 8, the lens mount 38 supports the lenses 39, 40. The lenses must be exactly the same focal length in order that the rows 35, 36 (Figure 7) of images can be brought into flow at the exact ratio of movement of film to copy. The lenses in Figure 8 may have a back focal length of 20 mm. in which case the space between the face of the cap 41 having the twin slits 42, 43 therein, is about 5 mm.

As shown in Figure 9, the slits are each .050 inch wide and sufficiently long to form an image of the desired width to fit on the 16 mm. film strip produced by slitting the 35 mm. strip as previously described.

A baffle 44, Figure 10 extends transverse the cap between the slits to insure that the twin images do not overlap. This may extend downward into the mount 38 about .170 inch, and may be about .095 inch thick, ⅛ inch wide at the bottom and ¼ inch wide at the top—tapered as shown in Figure 10.

The cap 41 is close to the emulsion side of the film F (the drawing Figure 9 is merely diagrammatic) and the division or baffle 41 therefore acts as a mask and not as a vignetter or diaphragm.

While the arrangement shown in Figure 8 does not eliminate all of the difficulties listed under paragraphs A, B, C and D hereof, it is useful in that old cameras can be used to make the film shown in Figure 7 merely by substituting the twin-lens mount of Figure 8 for the existing single lenses therein.

Width of the fields of view 45, 46 of the lenses Figure 8 transverse the direction of flow are sufficient to include copy such as documents, etc., 14 inches wide when located in the focal plane of these lenses, and of course this depends upon the characteristics such as focal length, etc., of the lenses.

To obtain the advantages set forth in connection with the lens mounts, Figures 3 to 6 inclusive, with a twin-lens mount as shown in Figure 8, it is only necessary to modify the twin-lens mount as shown in said Figures 3 to 6 inclusive.

For example, the mount Figure 8 may have the arm 24 and platen 26 of Figures 3 and 4, with or without the roller 30 of Figure 5; or the mount Figure 8 can have the arcuate platen 31 on which the film F is supported as described in connection with Figure 6.

All of the new lens mounts herein described may be removably mounted on the camera frame 10. This may be accomplished in any suitable manner, such as by the provision of the gibs 45

Figure 3, the base 46 of the mount being tapered as shown so that the mount can be pushed into the gibs and held between them and against vertical movement. A stop 47 can be secured to the frame 10 (Figure 8) to aid in positioning the lens mount in the camera.

As the single and double lens mounts can be made interchangeable, they can be used at will in any given camera and are readily interchangeable among cameras on a production line in the factory without the necessity of any re-focussing.

As the distance between the lens and film are fixed within the mount itself, mounts of the type shown in Figures 3–6 inclusive and the twin lens mount as shown in Figure 8 modified in accordance with the disclosure of Figure 6 can be mounted on an optical bench or its equivalent and the lens-to-film distance "N" very accurately adjusted in a manner that cannot be accomplished in photographic devices wherein the lens is mounted on one part of the framework and the film supported on another, as described in connection with Figures 1 and 2. The invention therefore eliminates much of the precision work heretofore necessary and which made it not only difficult to interchange lenses in any given camera, but made it practically impossible to change lenses between cameras without having to re-focus the lens. The feeding elements for feeding the film from one reel to another may be of any desired type, such, for example, as those shown in the aforesaid co-pending applications. It will be noted that the slit forming member such as the caps 31 or 41 is located between the feeding elements that drive the film and between which the film is tensioned. These caps therefore, press upon and displace the tensioned film in a plane perpendicular to the path of travel of the film, the latter being held against the slit or slits which therefore define the exposed area or areas on the film, which is preferably emulsion side down on the cap.

What is claimed is:

1. In combination with a microfilm camera wherein the copy and film are in flow during photography, a combined lens mounting and film support comprising a tubular frame adapted to be mounted in said camera and positioned a fixed distance from the copy support thereof, a lens carried by said frame and adapted to receive light reflected from copy on said copy support located in the focal field of said lens and project an image of said copy, and means carried by said frame for positioning a film in the back focus of said lens to receive said image, including a slotted cap secured to the outer end of said frame and closing the same, said cap being adjustable along a line parallel to the axis of said lens.

2. In combination with a microfilm camera wherein the copy and film are in flow during photography, a combined lens mounting and film support comprising a tubular frame adapted to be mounted in said camera and positioned a fixed distance from the copy support thereof, a lens carried by said frame and adapted to receive light reflected from copy on said copy support located in the focal field of said lens and project an image of said copy, and means carried by said frame for positioning a film in the back focus of said lens to receive said image, including a slotted cap secured to the outer end of said frame and closing the same, said cap comprising a platen having a roller therein extending transverse the optical axis of said lens and perpendicular thereto.

3. In combination with a microfilm camera wherein the copy and film are in flow during photography, a combined lens mounting and film support comprising a frame adapted to be mounted in said camera and positioned a fixed distance from the copy support thereof, a lens carried by said frame and adapted to receive light reflected from copy on said copy support located in the focal field of said lens and to project an image of said copy, and means including a convex cap carried by said frame forming a slit overlying said lens and adapted to define the area on a film in said camera exposed to said lens to receive said image, said frame and cap being bodily removable from said camera as a unit, the relative position of said parts remaining fixed the while.

4. In combination with a microfilm camera wherein the film and copy are in flow during photography, a combined lens mounting and film support comprising a frame adapted to be supported on the framework of the camera and positioned a fixed distance from the copy support thereof, a lens secured to said frame and adapted to receive light reflected from copy on said copy support located in the focal plane of said lens, means carried by said frame forming a slit overlying said lens and adapted to define an area on a film in said camera, said area receiving an image via said lens of copy on said copy support and means carried by said frame and spaced apart from said first means for positioning a film to overlie said slit and support said film in the back focus of said lens, said frame and slit forming means being bodily removable from said camera as a unit, the relative position of said parts remaining fixed the while.

5. In photographic apparatus, a framework, means for continuously moving a film mounted on said framework, a lens mounting removably supported on said framework and having outwardly extended portions adapted to engage said framework to position said mount thereon, said mount having a cylindrical portion adapted to receive a lens mounting frame, a cylindrical lens mounting frame and lenses therein adapted to be adjustably positioned in said cylindrical portion of said mount and to be held therein in fixed relation thereto, and a slit-forming member overlying said lens mount and supported thereby and adapted to engage and support said moving film in the rear focus of said lenses, said lens mount, slit-forming member and lenses forming a unit structure removable from said photographic device and replaceable therein as a unit, the relative position of said parts remaining fixed the while.

6. In a photographic device having a lens and a mounting therefor, a framework, a support secured to said framework and positioned in the focal field of said lens, a support for said lens mounting secured to said framework, a cap having an arcuate upper face secured to said support and overlying said lens and having an open slot extending across said face in a plane perpendicular to and intersecting the optical axis of said lens, said support and cap forming an enclosure for said lens and mounting, said cap being adapted to support a film on its arcuate upper face for transport in a plane transverse the axis of said lens and spaced apart therefrom solely by said support, said lens support and cap being bodily removable from said framework as a unit the relative position of said parts remaining fixed the while.

VERNEUR E. PRATT.
GEORGE F. GRAY.

REFERENCES CITED

The following references are of record in the file of this patent:

UNITED STATES PATENTS

| Number | Name | Date |
|---|---|---|
| 288,025 | Colt | Nov. 6, 1883 |
| 910,322 | Schultze | Jan. 19, 1909 |
| 1,616,636 | Prosser | Feb. 8, 1927 |
| 1,787,808 | Wittel | Jan. 6, 1931 |
| 1,839,217 | Greibach | Jan. 5, 1932 |
| 1,883,510 | Bornmann | Oct. 18, 1932 |
| 1,973,542 | Shull | Sept. 11, 1934 |
| 2,077,860 | Day | Apr. 20, 1937 |
| 2,090,398 | Hoyt | Aug. 17, 1937 |
| 2,381,228 | Schmidt | Aug. 7, 1945 |
| 2,419,836 | Holbrook | Apr. 29, 1947 |
| 2,443,171 | Tuttle | June 8, 1948 |

FOREIGN PATENTS

| Number | Country | Date |
|---|---|---|
| 864,528 | France | Jan. 21, 1941 |